(12) United States Patent
Ackland et al.

(10) Patent No.: US 7,631,928 B2
(45) Date of Patent: Dec. 15, 2009

(54) VEHICLE HOOD REINFORCEMENT STRUCTURES

(75) Inventors: Jeffrey Robert Ackland, Victoria (AU); Rich J. Evenden, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/937,890

(22) Filed: Nov. 9, 2007

(65) Prior Publication Data

US 2009/0121519 A1    May 14, 2009

(51) Int. Cl.
    *B62D 25/10* (2006.01)
(52) U.S. Cl. ................................... 296/193.11
(58) Field of Classification Search ............ 296/193.11, 296/187.03, 187.04, 187.09; 180/69.2, 69.21
    See application file for complete search history.

(56) References Cited

U.S. PATENT DOCUMENTS

| | | | |
|---|---|---|---|
| 4,359,120 A | 11/1982 | Schmidt et al. | |
| 5,538,094 A * | 7/1996 | Cobes et al. | 180/69.2 |
| 6,182,782 B1 | 2/2001 | Matsuura et al. | |
| 6,193,304 B1 * | 2/2001 | Takahashi et al. | 296/192 |
| 6,193,305 B1 * | 2/2001 | Takahashi | 296/192 |
| 6,237,992 B1 | 5/2001 | Howard | |
| 6,554,341 B2 | 4/2003 | Lee | |
| 6,588,526 B1 | 7/2003 | Polz et al. | |
| 6,634,702 B1 | 10/2003 | Pleschke et al. | |
| 6,802,556 B2 | 10/2004 | Mattsson et al. | |
| 6,824,199 B2 | 11/2004 | Weik et al. | |
| 7,000,720 B2 | 2/2006 | Polz et al. | |
| 7,055,894 B2 * | 6/2006 | Ikeda et al. | 296/187.09 |
| 7,296,845 B2 * | 11/2007 | Seksaria et al. | 296/146.6 |
| 2002/0057003 A1 | 5/2002 | Yoshida et al. | |
| 2002/0060474 A1 | 5/2002 | Chung | |
| 2003/0184122 A1 | 10/2003 | Thelen et al. | |
| 2004/0080180 A1 | 4/2004 | Cartella | |
| 2004/0251716 A1 | 12/2004 | Choi et al. | |
| 2006/0060408 A1 | 3/2006 | Kalliske et al. | |
| 2006/0226679 A1 | 10/2006 | Mairing | |

FOREIGN PATENT DOCUMENTS

JP    2007-69643    *    3/2007

* cited by examiner

*Primary Examiner*—Dennis H Pedder
(74) *Attorney, Agent, or Firm*—Dinsmore & Shohl LLP

(57) ABSTRACT

Vehicle hood reinforcement structures as provided to reduce impact in collisions. In one embodiment, the structure is to include a lower reinforcement panel configured to mount to a vehicle chassis and an upper reinforcement panel welded to the lower reinforcement panel wherein the deflection of a front deformable wall of the upper reinforcement panel is configured to trigger deflection of rear deformable wall of the lower reinforcement panel.

20 Claims, 5 Drawing Sheets

US 7,631,928 B2

VEHICLE HOOD REINFORCEMENT STRUCTURES

TECHNICAL FIELD

Embodiments of the present invention generally relate to vehicle hood reinforcement structures, and specifically relate to systems and methods of using vehicle hood reinforcement structures to reduce the impact to a pedestrian in a collision with a vehicle.

BACKGROUND

Over the past few decades, automobile manufacturers have made numerous innovations in automobile safety devices, and thus have greatly improved the safety of vehicle passengers. However, there has been a deficiency of innovative safeguards to protect pedestrians who may be hit by the front end of a passenger automobile. Vehicle collisions with pedestrians may cause severe injuries, such as life-threatening head trauma due to the pedestrian's head contacting the vehicle hood. The likelihood of head trauma from vehicle collisions is increased depending on the speed of the vehicle, the size of the vehicle, and the height of the hood. Larger vehicles, such as sports utility vehicles (SUV), have larger vehicle weights than other cars, and also have higher hood heights. Consequently, an SUV colliding with a pedestrian will contact a pedestrian with a greater force due to the increased weight, and will deliver that force at a higher point on the pedestrian's torso (i.e. a region closer to the head) due to the higher hood height. Accordingly, there is a need for vehicle hood structures having improved flexibility to absorb more of the impact and lessen the impact force on the pedestrian.

SUMMARY

In accordance with one embodiment, a vehicle hood reinforcement structure is provided. The vehicle hood reinforcement structure comprises a lower reinforcement panel configured to mount to a vehicle chassis and an upper reinforcement panel attached to the lower reinforcement panel. The lower reinforcement panel comprises a floor member and a rear deformable wall disposed at a rear edge of the floor member, wherein the rear deformable wall comprises a bend line configured to facilitate deflection of the rear deformable wall. The upper reinforcement panel comprises a ceiling member and a front deformable wall extending downwardly from a front edge of the ceiling member, wherein the front deformable wall comprises a bend line configured to facilitate deflection of the front deformable wall along its bend line in response to an impact or collision. The deflection of the front deformable wall is configured to trigger deflection of the rear deformable wall along its bend line.

In accordance with another embodiment, a vehicle hood reinforcement structure comprising a lower reinforcement panel and an upper reinforcement panel attached to the lower reinforcement panel is provided. The upper reinforcement panel is configured to deflect in response to an impact or collision and is also configured to trigger deflection in the lower reinforcement panel, wherein the deflection of the upper reinforcement panel and the lower reinforcement panel defines a Head Injury Criteria (HIC) value between about 300 to about 700.

These and additional objects and advantages provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawings enclosed herewith. The drawing sheets include.

Figure 1:
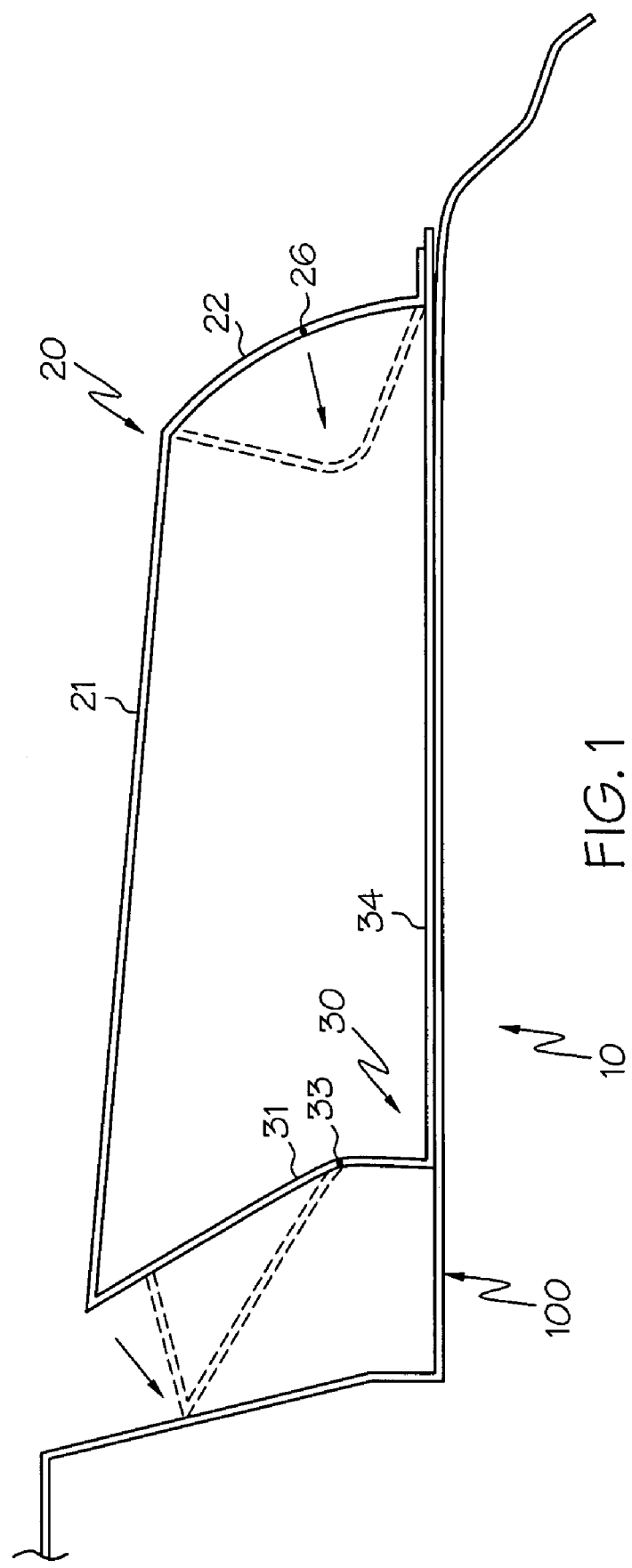
FIG. 1 is a side view of a vehicle hood reinforcement structure according to one or more embodiments of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION

Figure 2:
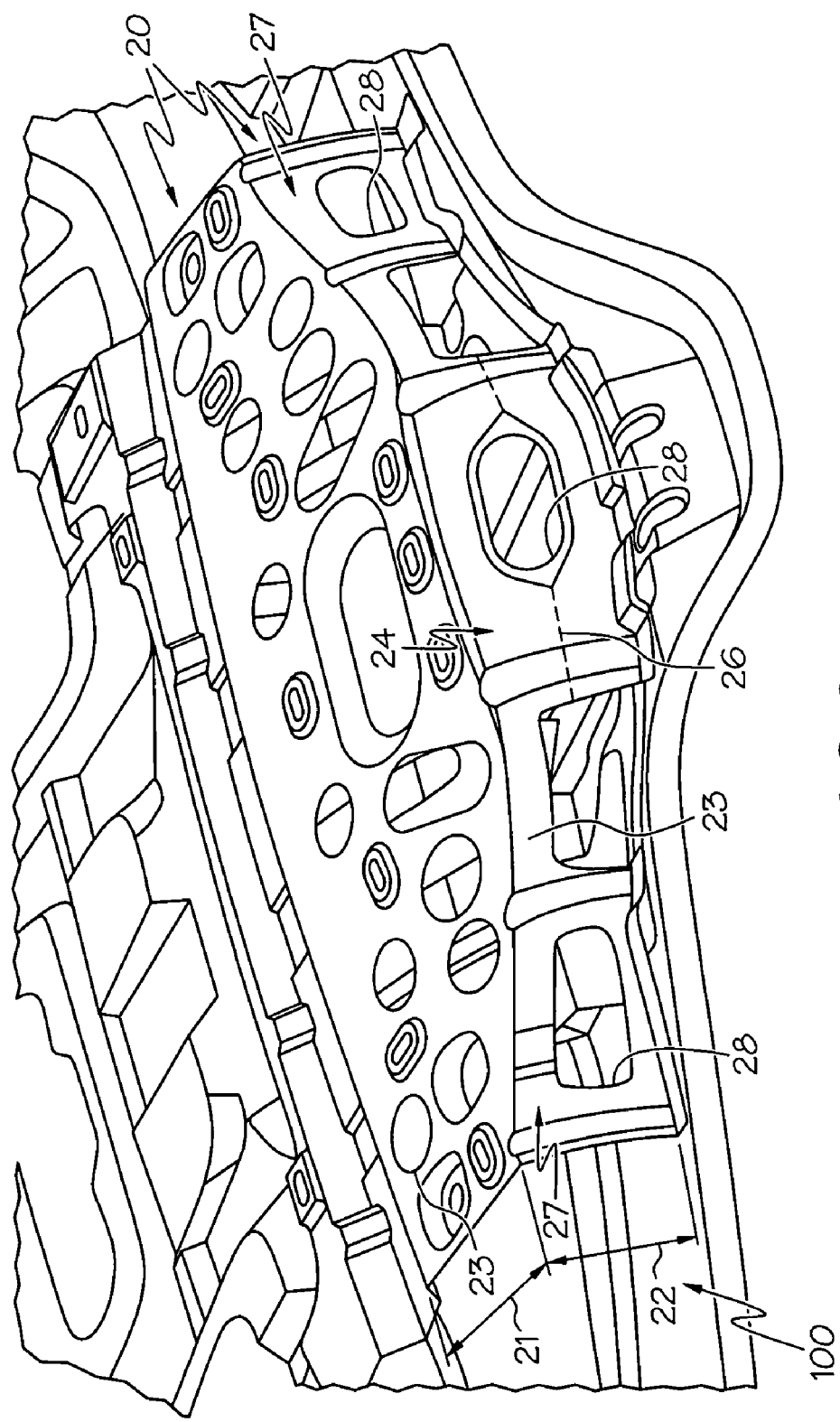
FIG. 2 is a top view of a vehicle hood reinforcement structure according to one or more embodiments of the present invention.
Figure 3:
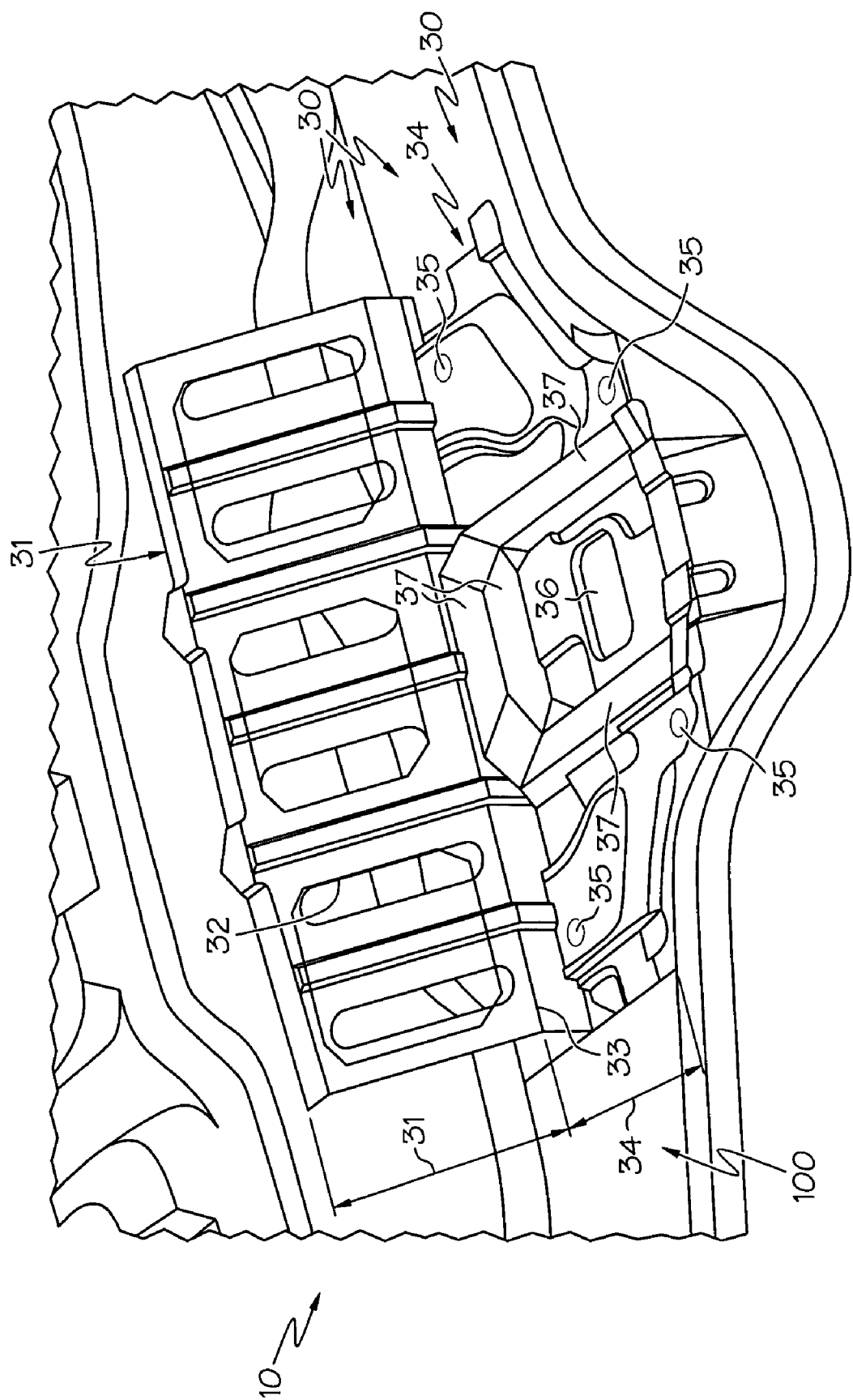
FIG. 3 is a top view illustrating only the lower reinforcement panel of a vehicle hood reinforcement structure according to one or more embodiments of the present invention.

Referring generally to FIGS. 1-3, embodiments of a vehicle hood reinforcement structure 10 are provided, wherein the vehicle hood reinforcement structure 10 is configured to lessen the impact to a pedestrian in a vehicle collision. Specifically, the vehicle hood reinforcement structure 10 is configured to collapse uniformly in response to a vehicle collision. Uniform deflection dampens the amount of impact delivered to a pedestrian in a collision.

Figure 6:
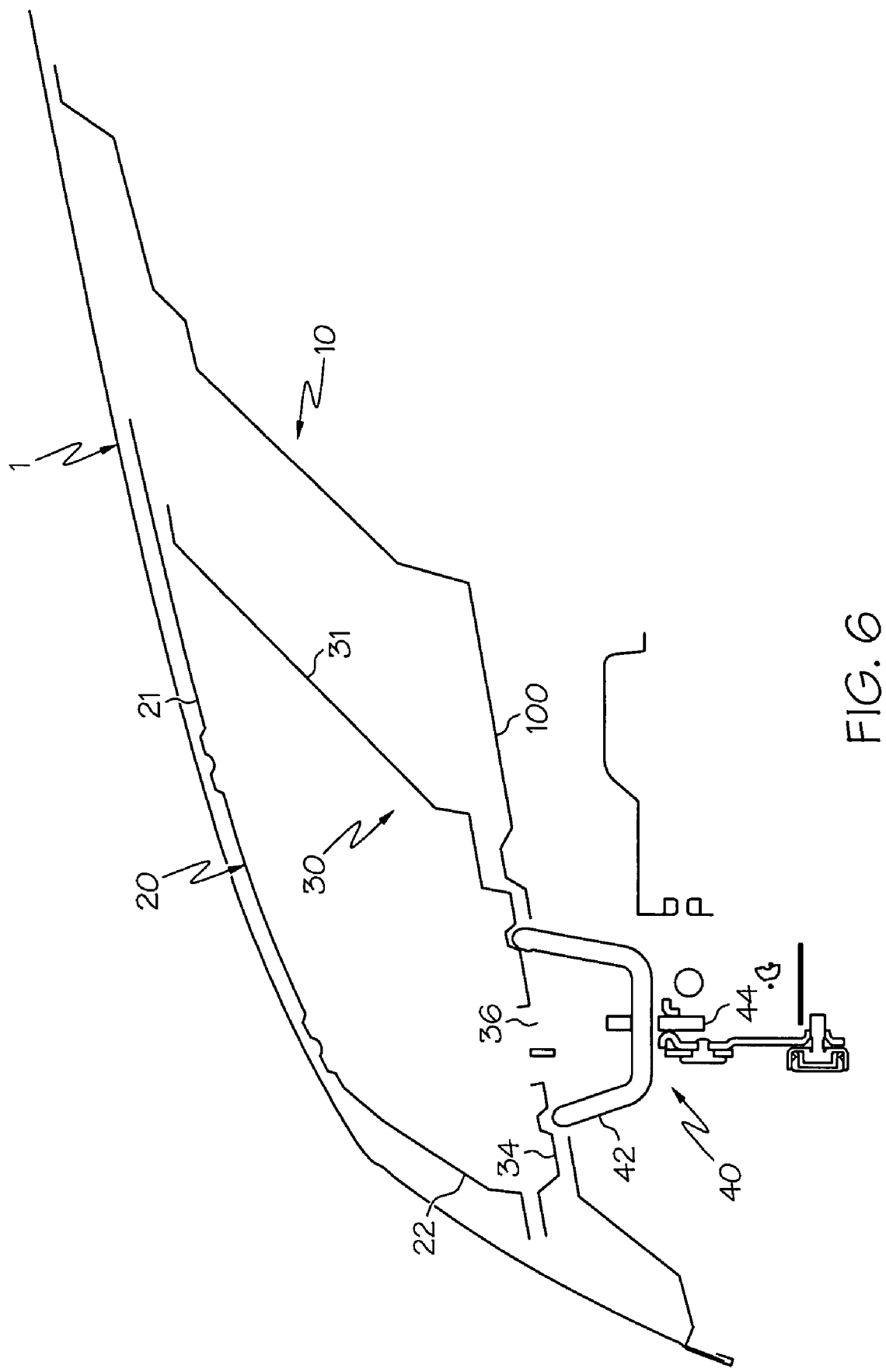
FIG. 6 is a side view illustrating the vehicle hood reinforcement structure disposed between the hood and the vehicle chassis according to one or more embodiments of the present invention.

The vehicle hood reinforcement structure 10 is applicable to all vehicles, regardless of size (e.g. compact cars or sport utility vehicles). Referring to FIG. 6, the vehicle hood reinforcement structure 10 may be specifically dimensioned such that the vehicle hood reinforcement structure 10 is installed between the upper surface of the vehicle chassis 100 and the hood 1 in a manner which does not detract from the styling and design of the vehicle. It is also contemplated that the structure 10 may add to the aesthetic appeal of the vehicle.

Referring to the embodiment of FIG. 1, the vehicle hood reinforcement structure 10 comprises a lower reinforcement panel 30 configured to mount to a vehicle chassis 100 and an upper reinforcement panel 20 attached (e.g. welded) to the lower reinforcement panel 30. The components of the vehicle hood reinforcement structure 10 comprise materials that have durability, while also providing the requisite flexibility necessary for the deflection of the vehicle hood reinforcement structure 10. For example, and not by way of limitation, the vehicle hood reinforcement structure 10 may comprise durable metal materials (e.g. sheet metal, steel, aluminum, or combinations thereof).

Referring to FIGS. 1 and 3, the lower reinforcement panel 30 may comprise a floor member 34 and a rear deformable wall 31 disposed at a rear edge of the floor member 34 and extending upwardly therefrom. The rear deformable wall 31 comprises a bend line 33 (e.g. a perforated or scored or bent region) configured to facilitate deflection of the rear deformable wall 31. As shown in FIG. 1, the rear deformable wall 31 may deflect backwards and downwardly along the bend line 33 upon striking an object (or upon the vehicle hood, which covers the structure, striking an object). The rear deformable wall 31 may comprise various structures and shapes optimizable to achieve the desired flexibility. In one embodiment, the rear deformable wall 31 is slanted to encourage collapsibility in response to a direct head impact. To improve the performance of the vehicle hood reinforcement structure 10 in collisions, it may be desirable to provide at least 80 mm clearance between the hood and outer chassis 100.

Referring to FIGS. 1 and 2, the upper reinforcement panel 20 comprises a ceiling member 21 and a front deformable wall 22 (e.g., shear wall) extending downwardly from a front edge of the ceiling member 21. Like the rear deformable wall 34, the front deformable wall 22 comprises a bend line 26 configured to facilitate deflection of the front deformable wall 22 along its bend line 26 in response to an impact or collision (e.g. a collision with a pedestrian). As shown in the embodiment of FIG. 1, the front deformable wall 22 deflects inwardly. In response to a collision, the inward deflection of the front deformable wall 22 triggers the deflection of the rear deformable wall 31 along its bend line 33. Also as shown in FIG. 1, the ceiling member 21 of the upper reinforcement panel 20 may be disposed substantially parallel to the floor member 34, and the ceiling member 21 may be welded to the upper edge of the rear deformable wall 31. Due to this arrangement, as the front deformable wall 22 is collapsed, the ceiling member 21 may be driven backward into the rear deformable wall 31, thereby deflecting the rear deformable wall 31 along its bend line 33.

In the embodiment of FIG. 2, the front deformable wall 22 comprises a pair of outer legs 27 and a central leg 24 interposed between the outer legs 27 at a spaced distance. The spaces between the outer legs 27 and central leg 24 as well as the cutout regions 28 of the central and outer legs 27 may assist in the uniform deflection of the front deformable wall 22 by reducing the rigidity of the front deformable wall 22. Additionally, the central leg 24 may comprise the bend line 26 of the front deformable wall 22 extending substantially along its midpoint. As described above, the bend line 26 helps guide the manner in which the front deformable wall 22 deflects.

Referring to FIGS. 2 and 3, the vehicle hood reinforcement structure 10 may also comprise cutout regions in various other locations. A cutout region reduces the mass of its associated component, thereby increasing deflection and reducing rigidity of the component and the vehicle hood reinforcement structure 10 incorporating the component. Furthermore, the cutout regions reduce the rigidity of the structural components, thereby assisting the structure 10 in deflecting uniformly. As shown in FIGS. 2 and 3, the floor member 34, the back deformable wall 31, the ceiling member 21, and/or the front deformable wall 22 may comprise cutout regions (e.g., cutouts 23, 25, and 32). The area of the cutout regions can be between about 20% to about 50% relative to the remainder of the wall 22. It has been found that such an area assists with ability to deform and collapse.

Figure 5:
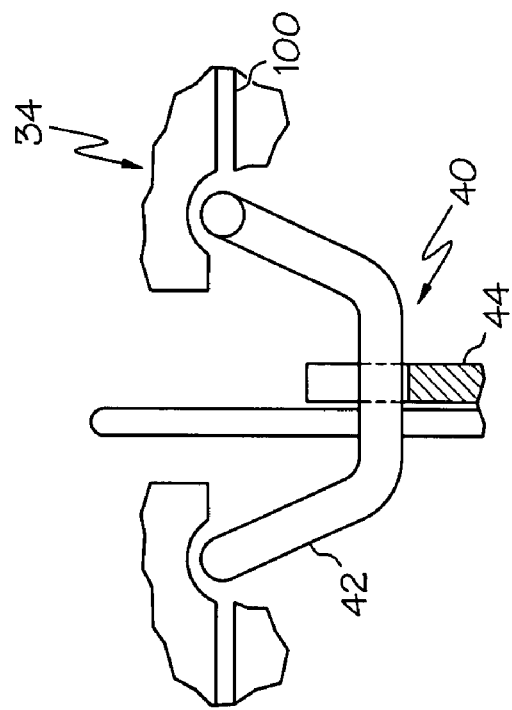
FIG. 5 is a rotated view of FIG. 4 illustrating the hood locking mechanism according to one or more embodiments of the present invention.
Figure 4:
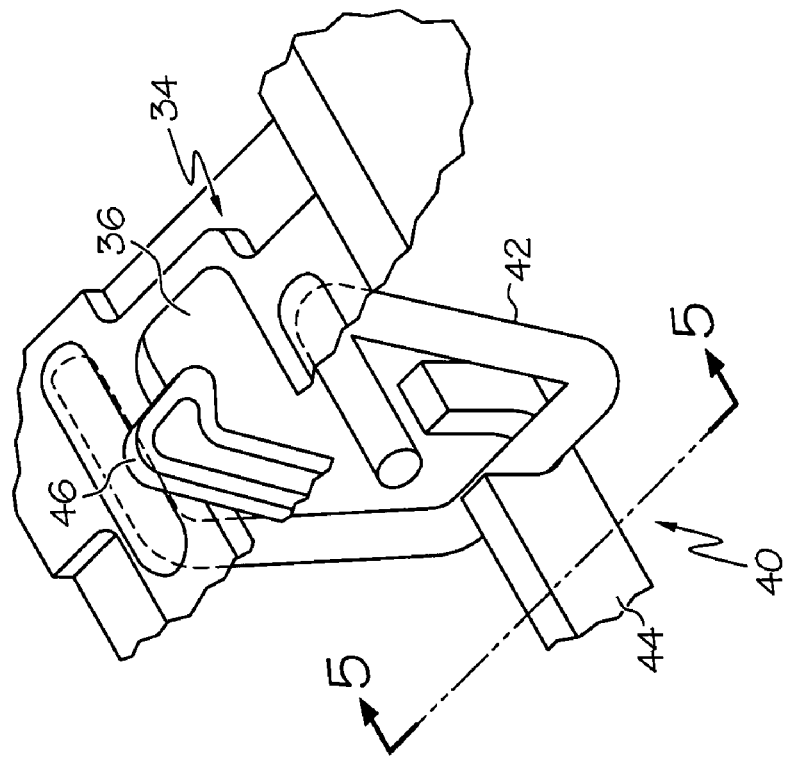
FIG. 4 is a side view illustrating the hood locking mechanism according to one or more embodiments of the present invention.

Referring to the embodiments of FIGS. 4-6, the vehicle hood reinforcement structure 10 makes accommodations for the hood locking mechanism 40. The hood locking mechanism 40 may comprise a locking striker, a locking hook, latches, or other combinations thereof. Other locking devices are also contemplated herein. Referring to the embodiments of FIGS. 4-6, the locking mechanism 40 may comprise a locking hook 42 extending from the floor member 34, and a striker 44 disposed within the chassis 100. During hood latching, the locking hook 42 extends downwardly and is engaged by the striker. As shown in FIG. 4, the vehicle hood reinforcement structure 10 may also include an auxiliary striker 46 to ensure proper hood latching. Referring to the embodiment of FIGS. 4 and 6, the floor member 34 comprises a locking receptacle 36 disposed over the locking hook 42. Referring to FIG. 5, the locking receptacle 36 comprises an opening for the locking striker 44 to extend through during hood latching. In one embodiment, the locking receptacle 36 is located substantially in the center of the floor member 34; however, other locations are contemplated herein.

Referring again to FIG. 3, the floor member 34 may comprise stiffening beams 37 at least partially surrounding the locking receptacle 36. Although the present discussion focuses on stiffening "beams" disposed on the floor member, other types of structural supports for the floor member are contemplated herein. In the embodiment of FIG. 3, the floor member 34 may comprise three beams 37, one disposed between the locking receptacle 36 and the rear deformable wall 31, and another pair of stiffening beams disposed on opposite sides of locking receptacle 36 and perpendicular to the other stiffening beam. Moreover, the floor member 34 may comprise at least one spot weld location 35 separated from the locking receptacle 36 by at least one of the stiffening beams 37. It has been found that this location increases durability. In addition to structural support, the stiffening beams 37 are configured to reduce stresses on the at least one spot weld location 35. As the vehicle hood reinforcement structure 10 collapses, forces pull upwardly on the spot weld locations 35 and the floor member 34. Moreover, the hood may move upwardly in response to roadside obstacles (e.g. speed bumps, uneven road surface, potholes), thus triggering upward forces/stresses on the locking receptacle 36 and the spot weld locations 35. By disposing the stiffening beams 37 between the locking receptacle 36 and the spot welds 35, the stiffening beams 33 can minimize the stresses to these spot weld locations 35. For example, the stiffening beams may help ensure no cracking of the welds in less than at least 3000 cycles, per vehicular standards.

In operation, the vehicle hood reinforcement structure 10 is designed to reduce the impact to pedestrians. One way to measure the impact of the hood reinforcement structure 10 is through the Head Injury Criteria (HIC). Without providing a full description of the HIC calculation methodology (which would be familiar to one of ordinary skill in the art), HIC is a function of head deceleration. In one calculation, a head deceleration (due to collision with a vehicle) over a stroke of 80 mm, without sudden decelerations (e.g. hitting hard points) will generally result in a HIC score of less than 1000. In one embodiment, the vehicle hood reinforcement structure 10 may comprise a HIC value of about 300 less than conventional structures. In a specific embodiment, the vehicle hood reinforcement structure 10 may comprise a HIC value of about 300 to about 700. Moreover, the vehicle hood reinforcement structure 10 may minimize impact by increasing the deflection distance. For example, the front deformable wall 22 may deflect by about 50 to about 70 mm, thereby absorbing more of the impact and distributing less impact to the pedestrian in a vehicle collision.

It is noted that terms like "specifically," "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A vehicle hood reinforcement structure comprising:
   a lower reinforcement panel configured to form at least part of a vehicle hood; and
   an upper reinforcement panel attached to the lower reinforcement panel, the upper reinforcement panel comprising a ceiling member;
   wherein the lower reinforcement panel comprises a floor member and a rear deformable wall disposed at a rear edge of the floor member, wherein the rear deformable wall extends from the floor member to the ceiling member and comprises a bend line at a location between the floor member and the ceiling member configured to provide a line of weakness between the floor member and the ceiling member to facilitate deflection of the rear deformable wall;
   wherein the upper reinforcement panel comprises the ceiling member and a front deformable wall extending downwardly from a front edge of the ceiling member, wherein the front deformable wall comprises a bend line configured to facilitate deflection of the front deformable wall along its bend line in response to an impact or collision,
   wherein the front deformable wall is configured such that deflection of the front deformable wall at an intermediate location along its bend line deflects the rear deformable wall along its bend line.

2. A vehicle hood reinforcement structure according to claim 1 wherein the rear deformable wall is slanted to reduce the height of the vehicle hood reinforcement structure.

3. A vehicle hood declined reinforcement structure according to claim 1 wherein the ceiling member of the upper reinforcement panel is substantially parallel to the floor member of the lower reinforcement panel.

4. A vehicle hood reinforcement structure according to claim 1 further comprising cutout regions in one or more of the floor member, the back deformable wall, the ceiling member, and the front deformable wall, wherein the cutout regions are configured to increase deflection and reduce rigidity of the vehicle hood reinforcement structure.

5. A vehicle hood reinforcement structure according to claim 1 wherein the floor member comprises a locking member configured to engage a hood locking mechanism.

6. A vehicle hood reinforcement structure according to claim 5 wherein the floor member comprises stiffening beams at least partially surrounding the locking member.

7. A vehicle hood reinforcement structure according to claim 6 wherein the floor member comprises at least one spot weld location separated from the locking member by at least one of the stiffening beams, wherein the stiffening beams are configured to reduce stresses on the at least one spot weld location.

8. A vehicle hood reinforcement structure according to claim 1 wherein the deformable wall of the upper reinforcement panel comprises a pair of outer legs and a central leg interposed between the outer legs at a spaced distance.

9. A vehicle hood reinforcement structure according to claim 8 wherein the central leg comprises the bend line of the front deformable wall extending substantially along its midpoint.

10. A vehicle hood reinforcement structure according to claim 9 wherein the central leg and the outer legs each comprise at least one cutout region.

11. A vehicle hood reinforcement structure according to claim 1 wherein the vehicle hood reinforcement structure comprises a sheet metal.

12. A vehicle comprising:
   a vehicle hood comprising a vehicle hood reinforcement structure comprising:
      a lower reinforcement panel; and
      an upper reinforcement panel attached to the lower reinforcement panel, the upper reinforcement panel including a ceiling member;
      wherein the lower reinforcement panel comprises a floor member and a rear deformable wall disposed at a rear edge of the floor member, wherein the rear deformable wall is connected to the ceiling member and to the floor member, the rear deformable wall including a line of weakness formed by perforations or a score line between the floor member and the ceiling member to facilitate deflection of the rear deformable wall at the line of weakness,
      wherein the upper reinforcement panel comprises the ceiling member and a front deformable wall extending downwardly from a front edge of the ceiling member, wherein the front deformable wall comprises a bend line configured to facilitate deflection of the front deformable wall along its bend line in response to an impact,
      wherein the front deformable wall is configured such that deflection of the front deformable wall along its bend line deflects the rear deformable wall along the line of weakness of the rear deformable wall.

13. A method of reducing impact to pedestrians in a vehicle collision comprising;
   mounting a vehicle hood reinforcement structure as at least a part of a vehicle hood, the vehicle hood reinforcement structure comprising:
      a lower reinforcement panel; and
      an upper reinforcement panel attached to the lower reinforcement panel, the upper reinforcement panel comprising a ceiling member;
      wherein the lower reinforcement panel comprises a floor member and a rear deformable wall disposed at a rear edge of the floor member, wherein the rear deformable wall is connected to the ceiling member and to the floor member,
      wherein the upper reinforcement panel comprises the ceiling member and a front deformable wall extending downwardly from a front edge of the ceiling member; and providing a line of weakness at an intermediate location in the rear deformable wall between the floor member and the ceiling member such that the vehicle hood reinforcement structure bends along the line of weakness in response to a collision.

14. A method according to claim 13 comprising deflecting a first portion of the front deformable wall connected to the ceiling member relative to a second portion of the front deformable wall connected to the floor member.

15. A method according to claim 13 wherein the line of weakness is a perforated line or score line formed in the rear deformable wall.

16. A vehicle hood reinforcement structure comprising:
a lower reinforcement panel configured to form at least part of a vehicle hood; and
an upper reinforcement panel attached to the lower reinforcement panel;
wherein the lower reinforcement panel comprises a floor member and a rear deformable wall disposed at a rear edge of the floor member, wherein the rear deformable wall comprises a bend line configured to facilitate deflection of the rear deformable wall;
wherein the upper reinforcement panel comprises a ceiling member and a front deformable wall extending downwardly from a front edge of the ceiling member, wherein the front deformable wall comprises a bend line configured to facilitate deflection of the front deformable wall along its bend line in response to an impact or collision,
wherein the front deformable wall is configured such that deflection of the front deformable wall triggers deflection of the rear deformable wall along its bend line, the deformable wall of the upper reinforcement panel comprising a pair of outer legs and a central leg interposed between the outer legs at a spaced distance, the central leg comprising the bend line of the front deformable wall extending substantially along its midpoint.

17. A vehicle hood reinforcement structure according to claim 16 wherein the central leg and the outer legs each comprise at least one cutout region.

18. A vehicle hood reinforcement structure according to claim 16 wherein the line of weakness comprises perforations or a score line.

19. A vehicle hood reinforcement structure according to claim 1 wherein the line of weakness comprises perforations or a score line.

20. A vehicle hood reinforcement structure of claim 12 wherein the front deformable wall of the upper reinforcement panel comprises a pair of outer legs and a central leg interposed between the outer legs at a spaced distance, the central leg comprising the bend line of the front deformable wall extending substantially along its midpoint.

* * * * *

UNITED STATES PATENT AND TRADEMARK OFFICE
CERTIFICATE OF CORRECTION

PATENT NO. : 7,631,928 B2  Page 1 of 1
APPLICATION NO. : 11/937890
DATED : December 15, 2009
INVENTOR(S) : Jeffrey Robert Ackland et al.

It is certified that error appears in the above-identified patent and that said Letters Patent is hereby corrected as shown below:

Claim 1, lines 37-40, should read:

-- wherein the front deformable wall is configured such that deflection of the front deformable wall ~~at an intermediate location~~ along its bend line deflects the rear deformable wall <u>at an intermediate location</u> along its bend line. --

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO.        : 7,631,928 B2                      Page 1 of 1
APPLICATION NO.   : 11/937890
DATED             : December 15, 2009
INVENTOR(S)       : Jeffrey Robert Ackland et al.

It is certified that error appears in the above-identified patent and that said Letters Patent is hereby corrected as shown below:

Column 5, Claim 1, lines 37-40, should read:

-- wherein the front deformable wall is configured such that deflection of the front deformable wall ~~at an intermediate location~~ along its bend line deflects the rear deformable wall <u>at an intermediate location</u> along its bend line. --

This certificate supersedes the Certificate of Correction issued February 16, 2010.

Signed and Sealed this

Twenty-third Day of March, 2010

David J. Kappos
*Director of the United States Patent and Trademark Office*